(12) United States Patent
He et al.

(10) Patent No.: US 10,164,324 B1
(45) Date of Patent: Dec. 25, 2018

(54) ANTENNA PLACEMENT TOPOLOGIES FOR WIRELESS NETWORK SYSTEM THROUGHPUTS IMPROVEMENT

(71) Applicant: Airgain Incorporated, San Diego, CA (US)

(72) Inventors: Ziming He, Irvine, CA (US); Yulong Chen, Zhang Jia Gang (CN); Daniel Dobransky, San Diego, CA (US); Nando Hunt, San Diego, CA (US); Brian Goodyear, San Diego, CA (US)

(73) Assignee: Airgain Incorporated, San Diego, CA (US)

( * ) Notice: Subject to any disclaimer, the term of this patent is extended or adjusted under 35 U.S.C. 154(b) by 0 days.

(21) Appl. No.: 15/667,596

(22) Filed: Aug. 2, 2017

Related U.S. Application Data

(63) Continuation-in-part of application No. 29/557,097, filed on Mar. 4, 2016, now Pat. No. Des. 829,693.

(60) Provisional application No. 62/461,013, filed on Feb. 20, 2017.

(51) Int. Cl.
*H01Q 1/24* (2006.01)
*H01Q 1/38* (2006.01)
*H01Q 25/00* (2006.01)
*H01Q 5/30* (2015.01)
*H04B 7/0404* (2017.01)

(52) U.S. Cl.
CPC ............ *H01Q 1/243* (2013.01); *H01Q 1/245* (2013.01); *H01Q 1/38* (2013.01); *H01Q 5/30* (2015.01); *H01Q 25/00* (2013.01); *H04B 7/0404* (2013.01)

(58) Field of Classification Search
CPC .......... H01Q 1/243; H01Q 1/38; H01Q 1/245; H01Q 5/30; H01Q 25/00
USPC ........................................................ 343/702
See application file for complete search history.

(56) References Cited

U.S. PATENT DOCUMENTS

| | | | |
|---|---|---|---|
| 7,061,437 B2 | 6/2006 | Lin et al. |
| 7,148,849 B2 | 12/2006 | Lin |
| 7,215,296 B2 | 5/2007 | Abramov et al. |
| D546,821 S | 7/2007 | Oliver |
| D549,696 S | 8/2007 | Oshima et al. |
| 7,333,067 B2 | 2/2008 | Hung et al. |
| 7,336,959 B2 | 2/2008 | Khitrik et al. |
| D573,589 S | 7/2008 | Montgomery et al. |
| 7,405,704 B1 | 8/2008 | Lin et al. |
| 7,477,195 B2 | 1/2009 | Vance |
| D592,195 S | 5/2009 | Wu et al. |
| 7,570,215 B2 | 8/2009 | Abramov et al. |
| D599,334 S | 9/2009 | Chiang |
| D606,053 S | 12/2009 | Wu et al. |
| D607,442 S | 1/2010 | Su et al. |
| D608,769 S | 1/2010 | Bufe |
| D612,368 S | 3/2010 | Yang et al. |
| 7,705,783 B2 | 4/2010 | Rao et al. |
| 7,729,662 B2 | 6/2010 | Abramov et al. |
| D621,819 S | 8/2010 | Tsai et al. |
| 7,843,390 B2 | 11/2010 | Liu |
| D633,483 S | 3/2011 | Su et al. |

(Continued)

*Primary Examiner* — Lam T Mai
(74) *Attorney, Agent, or Firm* — Clause Eight IPS; Michael Catania

(57) ABSTRACT

A combined antenna placement topology is disclosed herein. The combined antenna placement topology is utilized to get optimized antenna isolation, efficiency, system coverage and throughputs. The combined topology includes antenna location diversity, polarization diversity and antenna type diversity.

6 Claims, 24 Drawing Sheets

(56) References Cited

U.S. PATENT DOCUMENTS

| | | |
|---|---|---|
| D635,127 S | 3/2011 | Tsai et al. |
| 7,907,971 B2 | 3/2011 | Salo et al. |
| D635,560 S | 4/2011 | Tsai et al. |
| D635,963 S | 4/2011 | Podduturi |
| D635,964 S | 4/2011 | Podduturi |
| D635,965 S | 4/2011 | Mi et al. |
| D636,382 S | 4/2011 | Podduturi |
| 7,965,242 B2 | 6/2011 | Abramov et al. |
| D649,962 S | 12/2011 | Tseng et al. |
| D651,198 S | 12/2011 | Mi et al. |
| D654,059 S | 2/2012 | Mi et al. |
| D654,060 S | 2/2012 | Ko et al. |
| D658,639 S | 5/2012 | Huang et al. |
| D659,129 S | 5/2012 | Mi et al. |
| D659,685 S | 5/2012 | Huang et al. |
| D659,688 S | 5/2012 | Huang et al. |
| 8,175,036 B2 | 5/2012 | Visuri et al. |
| 8,184,601 B2 | 5/2012 | Abramov et al. |
| D662,916 S | 7/2012 | Huang et al. |
| 8,248,970 B2 | 8/2012 | Abramov et al. |
| D671,097 S | 11/2012 | Mi et al. |
| 8,310,402 B2 | 11/2012 | Yang |
| D676,429 S | 2/2013 | Gosalia et al. |
| D678,255 S | 3/2013 | Ko et al. |
| 8,423,084 B2 | 4/2013 | Abramov et al. |
| D684,565 S | 6/2013 | Wei |
| D685,352 S | 7/2013 | Wei |
| D685,772 S | 7/2013 | Zheng et al. |
| D686,600 S | 7/2013 | Yang |
| D689,474 S | 9/2013 | Yang et al. |
| D692,870 S | 11/2013 | He |
| D694,738 S | 12/2013 | Yang |
| D695,279 S | 12/2013 | Yang et al. |
| D695,280 S | 12/2013 | Yang et al. |
| 8,654,030 B1 | 2/2014 | Mercer |
| D703,195 S | 4/2014 | Zheng |
| D703,196 S | 4/2014 | Zheng |
| D706,247 S | 6/2014 | Zheng et al. |
| D706,750 S | 6/2014 | Bringuir |
| D706,751 S | 6/2014 | Chang et al. |
| D708,602 S | 7/2014 | Gosalia et al. |
| D709,053 S | 7/2014 | Chang et al. |
| D710,832 S | 8/2014 | Yang |
| D710,833 S | 8/2014 | Zheng et al. |
| 8,854,265 B1 | 10/2014 | Yang et al. |
| D716,775 S | 11/2014 | Bidermann |
| 9,432,070 B2 | 8/2016 | Mercer |
| 2002/0003499 A1 | 1/2002 | Kouam et al. |
| 2004/0222936 A1 | 11/2004 | Hung et al. |
| 2005/0073462 A1 | 4/2005 | Lin et al. |
| 2005/0190108 A1 | 9/2005 | Lin et al. |
| 2006/0208900 A1 | 9/2006 | Tavassoli Hozouri |
| 2007/0030203 A1 | 2/2007 | Tsai et al. |
| 2008/0150829 A1 | 6/2008 | Lin et al. |
| 2009/0002244 A1 | 1/2009 | Woo |
| 2009/0058739 A1 | 3/2009 | Konishi |
| 2009/0135072 A1 | 5/2009 | Ke et al. |
| 2009/0262028 A1 | 10/2009 | Murnbru et al. |
| 2010/0188297 A1 | 7/2010 | Chen et al. |
| 2010/0309067 A1 | 12/2010 | Tsou et al. |
| 2011/0006950 A1 | 1/2011 | Park et al. |
| 2012/0038514 A1 | 2/2012 | Bang |
| 2012/0229348 A1 | 9/2012 | Chiang |
| 2012/0242546 A1 | 9/2012 | Hu et al. |
| 2013/0288612 A1* | 10/2013 | Afsahi ................. H03F 1/0222 455/73 |
| 2015/0162655 A1* | 6/2015 | Zhang .................. H01Q 1/243 343/702 |
| 2018/0138595 A1* | 5/2018 | Nysen ................... H01Q 1/246 |
| 2018/0151949 A1* | 5/2018 | Lin ...................... H01Q 1/3233 |

* cited by examiner

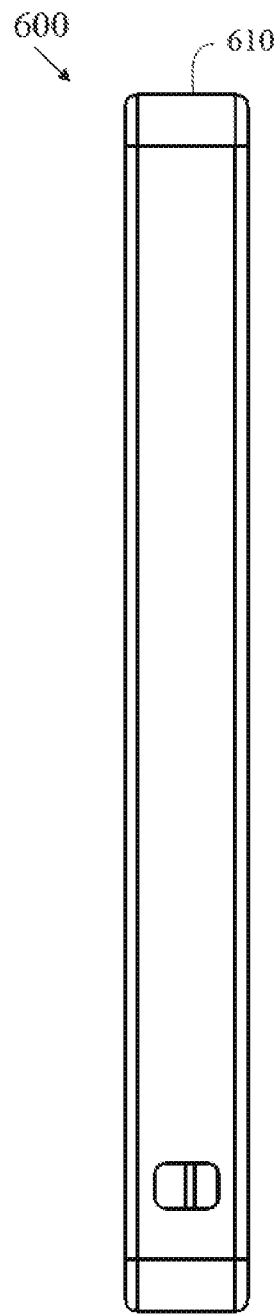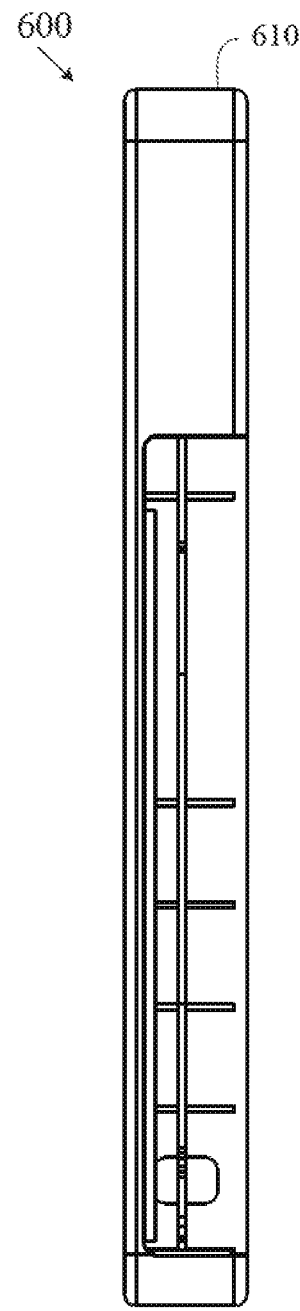
FIG. 34                    FIG. 35

US 10,164,324 B1

ANTENNA PLACEMENT TOPOLOGIES FOR WIRELESS NETWORK SYSTEM THROUGHPUTS IMPROVEMENT

CROSS REFERENCES TO RELATED APPLICATIONS

The Present Application claims priority to U.S. Patent Application No. 62/461,013, filed on Feb. 20, 2017, and is a continuation-in-part application of U.S. patent application Ser. No. 29/557,097, filed on Mar. 4, 2016, both of which are hereby incorporated by reference in their entireties.

STATEMENT REGARDING FEDERALLY SPONSORED RESEARCH OR DEVELOPMENT

Not Applicable

BACKGROUND OF THE INVENTION

Field of the Invention

The present invention generally relates to antennas.

Description of the Related Art

The prior art discusses various antenna systems.

Current wireless communication devices such as cellular phone, laptop, tablet computer etc. have an increasing demand for multi-band, high gain, high efficiency and compact size LTE antennas. However, in most cases the design of multi-band LTE antenna is very difficult, especially when the LTE700/800/900 bands are included, since it is very hard to get enough bandwidth with good return loss for each frequency band.

General definitions for terms utilized in the pertinent art are set forth below.

BLUETOOTH technology is a standard short range radio link that operates in the unlicensed 2.4 gigahertz band.

Code Division Multiple Access ("CDMA") is a spread spectrum communication system used in second generation and third generation cellular networks, and is described in U.S. Pat. No. 4,901,307.

GSM, Global System for Mobile Communications is a second generation digital cellular network.

The Universal Mobile Telecommunications System ("UMTS") is a wireless standard.

Long Term Evolution ("LTE") is a standard for wireless communication of high-speed data for mobile phones and data terminals and is based on the GSM/EDGE and UMTS/HSPA communication network technologies.

LTE Frequency Bands include 698-798 MHz (Band 12, 13, 14, 17); 791-960 MHz (Band 5, 6, 8, 18, 19, 20); 1710-2170 MHz (Band 1, 2, 3, 4, 9, 10, 23, 25, 33, 34, 35, 36, 37, 39); 1427-1660.5 MH (Band 11, 21, 24); 2300-2700 MHz (Band 7, 38, 40, 41); 3400-3800 MHz (Band 22, 42, 43).

Antenna impedance and the quality of the impedance match are most commonly characterized by either return loss or Voltage Standing Wave Ratio.

Surface Mount Technology ("SMT") is a process for manufacturing electronic circuits wherein the components are mounted or placed directly onto a surface of a printed circuit board ("PCB").

The APPLE IPHONE® 5 LTE Bands include: LTE700/1700/2100 (698-806 MHz/1710-1785 MHz/1920-2170 MHz); LTE 850/1800/2100 (824-894 MHz/1710-1880 MHz/1920-2170 MHz); and LTE 700/850/1800/1900/2100 (698-806 MHz/824-894 MHz/1710-1880 MHz/1850-1990 MHz/1920/2170).

The SAMSUNG GALAXY® SIII LTE Bands include: LTE 800/1800/2600 (806-869 MHz/1710-1880 MHz/2496-2690 MHz.

The NOKIA LUMIA® 920 LTE Bands: LTE 700/1700/2100 (698-806 MHz/1710-1785 MHz/1920-2170 MHz); LTE 800/900/1800/2100/2600 (806-869 MHz/880-960 MHz/1710-1880 MHz/1920-2170 MHz/2496-2690 MHz).

For wireless communication devices applications, there are generally three challenging requirements for embedded antenna: good performance, compact size and low cost. What is needed is an antenna that can meet the needs of the LTE/WiFi mobile device market.

BRIEF SUMMARY OF THE INVENTION

The purpose of the present invention is to provide different antenna placement topologies to improve system coverage and data throughput.

A combined antenna placement topology is utilized to get optimized antenna isolation, efficiency, system coverage and throughputs. The combined topology includes antenna location diversity, polarization diversity and antenna type diversity.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

FIG. 34 is side elevation view of the antenna system of FIG. 31.

FIG. 35 is a side elevation view of the antenna system of FIG. 31.

FIG. 36 is a top perspective view of the antenna system of.

DETAILED DESCRIPTION OF THE INVENTION

The present invention provides practical antenna placement topologies for optimizing system coverage and throughput of wireless networks.

Antenna location diversity, polarization diversity and type diversity is utilized to improve system coverage and throughputs.

In one embodiment, twelve antennas and multi-frequency bands are utilized to optimize system coverage and throughput of wireless networks. Specifically, four WiFi 2G antennas, four WiFi 5G antennas, two DECT antennas, one ZigBee antenna and one Zwave antenna are utilized. The WiFi 2G antennas are preferably 2400-2690 MegaHertz. The WiFi 5G antenna is preferably a 5.8 GigaHertz antenna.

A preferred first antenna operates at 5.15 GHz and a preferred second antenna operates at 5.85 GHz.

Other frequencies for the antennas include 5150 MHz, 5200 MHz, 5300 MHz, 5400 MHz, 5500 MHz, 5600 MHz, 5700 MHz, and 5850 MHz.

Another antenna frequency is 2.4 GHz.

The antenna system preferably operates on an 802.11 communication protocol. Most preferably, the antenna system operates on an 802.11n communication protocol. Alternatively, the antenna system operates on an 802.11b communication protocol. Alternatively, the antenna system operates on an 802.11g communication protocol. Alternatively, the antenna system 25 operates on an 802.11a communication protocol. Alternatively, the antenna system 25 operates on an 802.11ac communication protocol.

Antennal location diversity improves isolation among the antennas.

Antenna polarization diversity controls antenna radiation patterns to improve system coverage.

Antenna type diversity reduces antenna coupling with surrounding circuit large surface area metal parts to improve antenna efficiency.

To generate the antenna placements that optimize system coverage and throughput of wireless networks, a 3D file of a proposed module, mounting style and antenna specifications are reviewed to study the available antenna placement space and possibilities to achieve the specifications. Next, the antenna placement topology (location and polarization) is determined to ensure that the proposed antenna system provides the required isolation and system coverage. Next, antenna types are selected that provide the required performance (radiation pattern, efficiency, peak gain etc.). Next, passive over the air measurements are performed to the confirm the antenna system performance. Next, the antenna locations and polarization diversity and antenna type are optimized for system throughputs.

Figure 1:
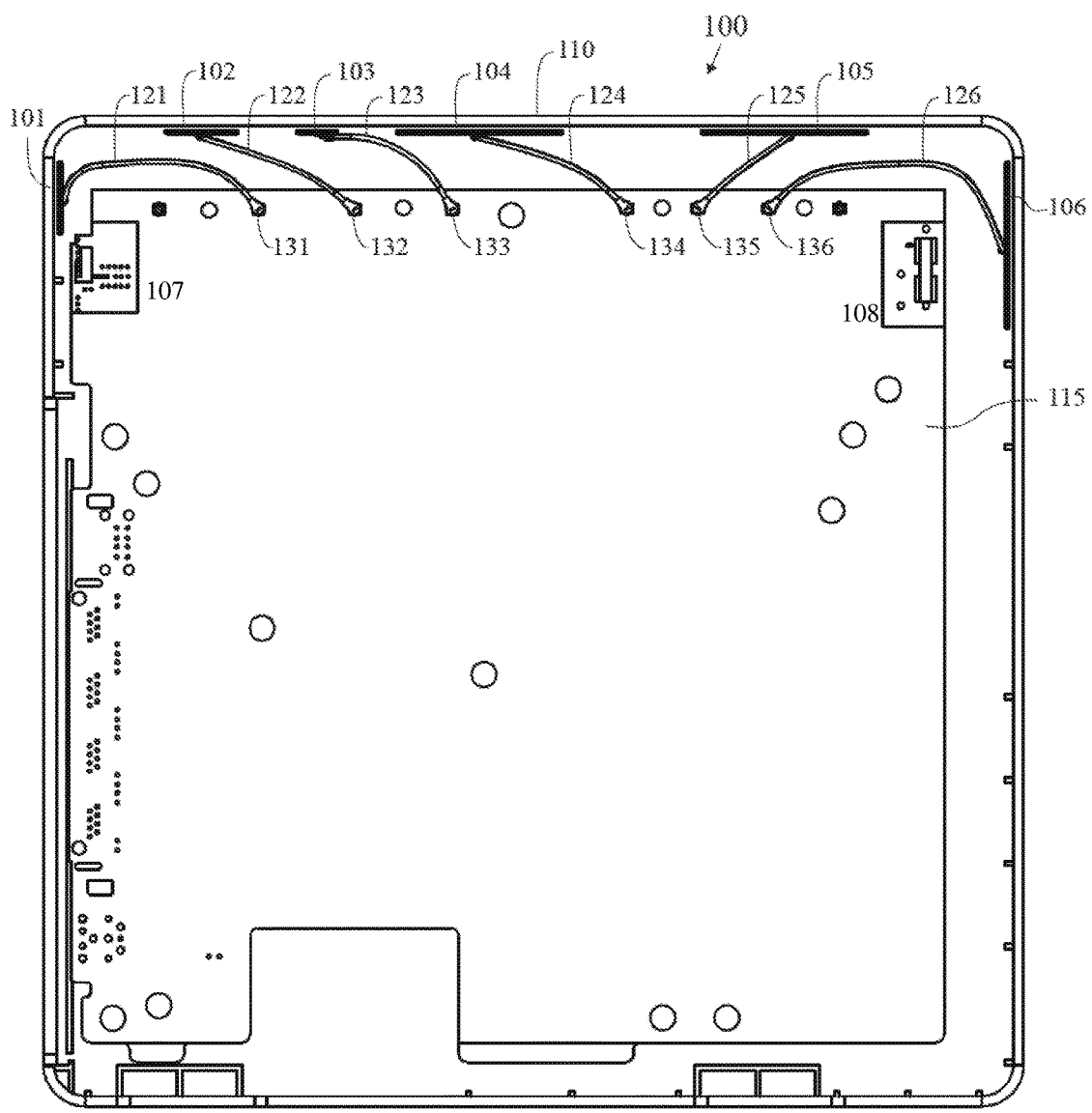
FIG. 1 is a top plan view of an antenna system.
Figure 2:
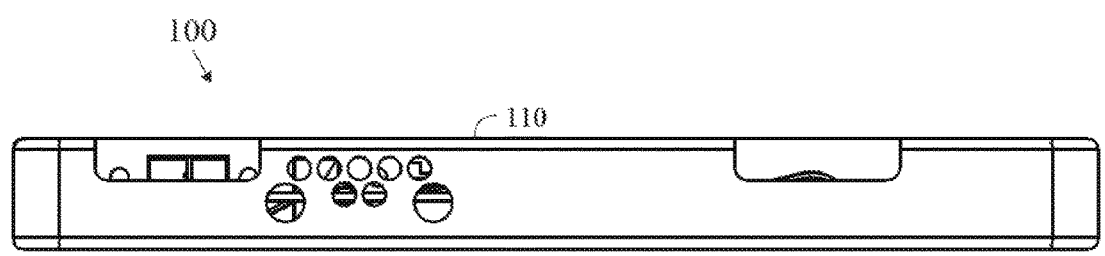
FIG. 2 is a front elevation view of the antenna system of FIG. 1.
Figure 3:
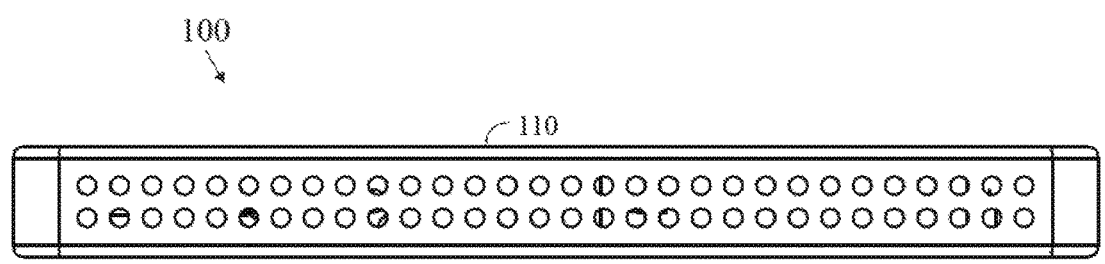
FIG. 3 is a rear elevation view of the antenna system of FIG. 1.
Figure 4:
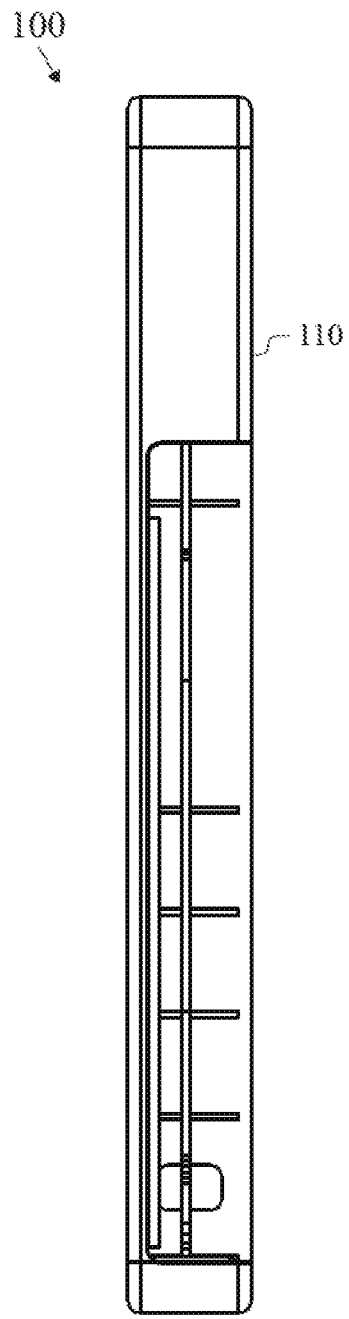
FIG. 4 is side elevation view of the antenna system of FIG. 1.
Figure 5:
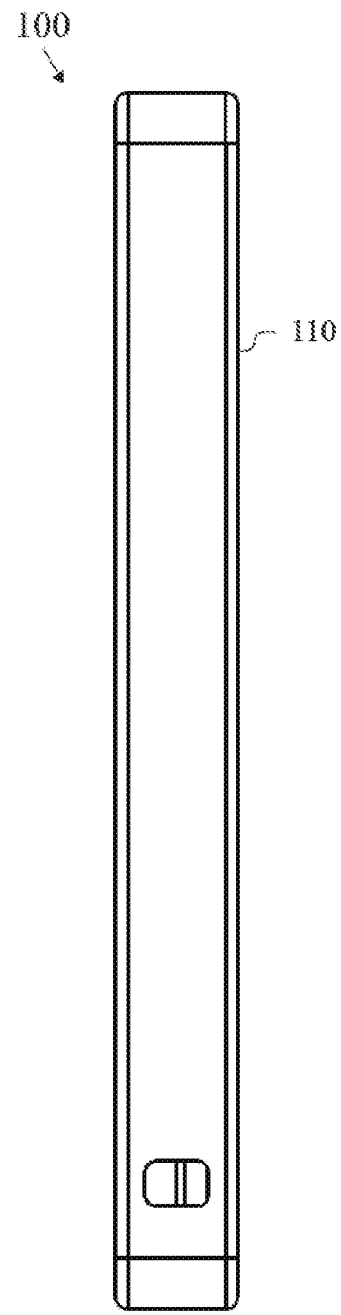
FIG. 5 is a side elevation view of the antenna system of FIG. 1.
Figure 6:
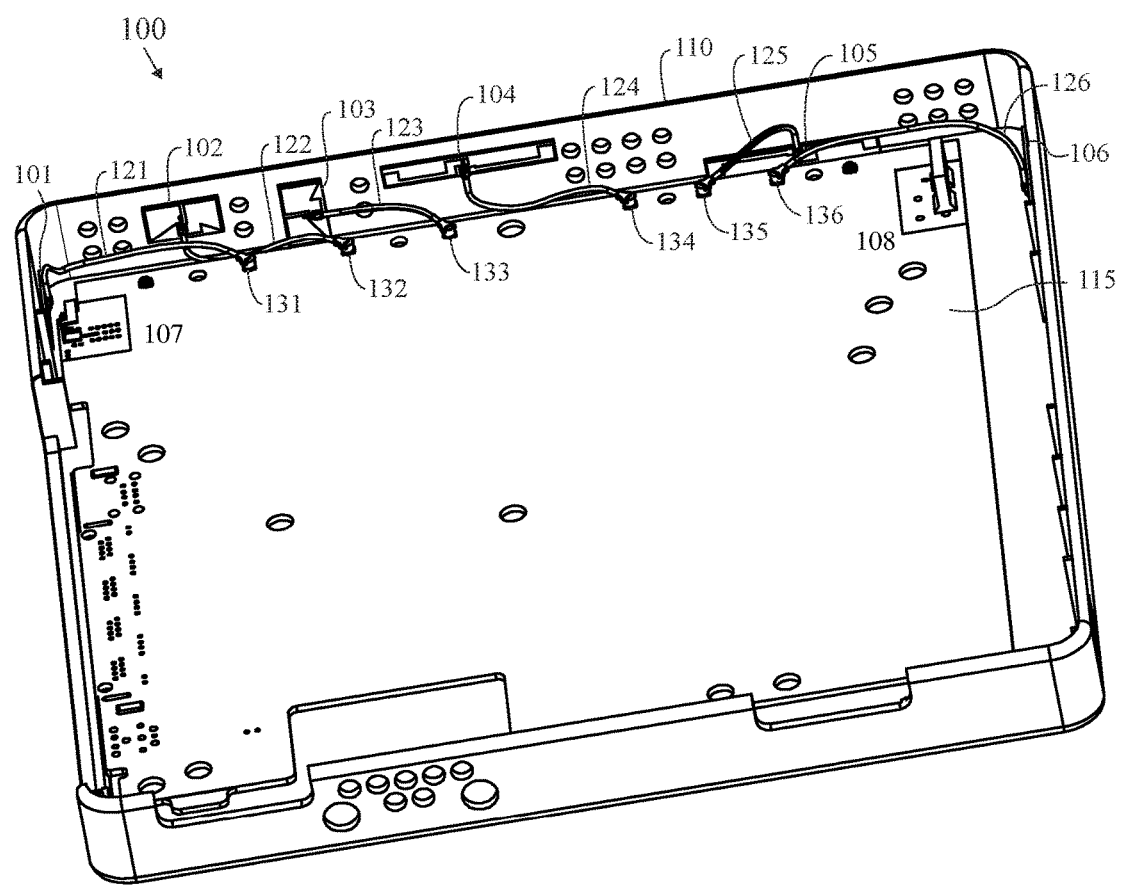
FIG. 6 is a top perspective view of the antenna system of FIG. 1.

In a first embodiment of an antenna placement topology shown in FIGS. 1-6, the antenna system 100 comprises three cable 5G antennas 101, 102, and 103, and one on-board 5G antenna 107; three cable 2G antennas 104, 105, and 106, and one on-board 2G antenna 108. The three cable 5G antennas 101, 102, and 103 include one vertical and two horizontal polarizations. The on-board antennas 107 and 108 have mixed polarizations. A PCB 115 is positioned within a housing 110.

A cable 121 links the 5G antenna 101 to a connector 131 on the PCB 115. A cable 122 links the 5G antenna 102 to a connector 132 on the PCB 115. A cable 123 links the 5G antenna 103 to a connector 133 on the PCB 115. A cable 124 links the 2G antenna 104 to a connector 134 on the PCB 115. A cable 125 links the 2G antenna 105 to a connector 135 on the PCB 115. A cable 126 links the 2G antenna 106 to a connector 136 on the PCB 115.

Figure 7:
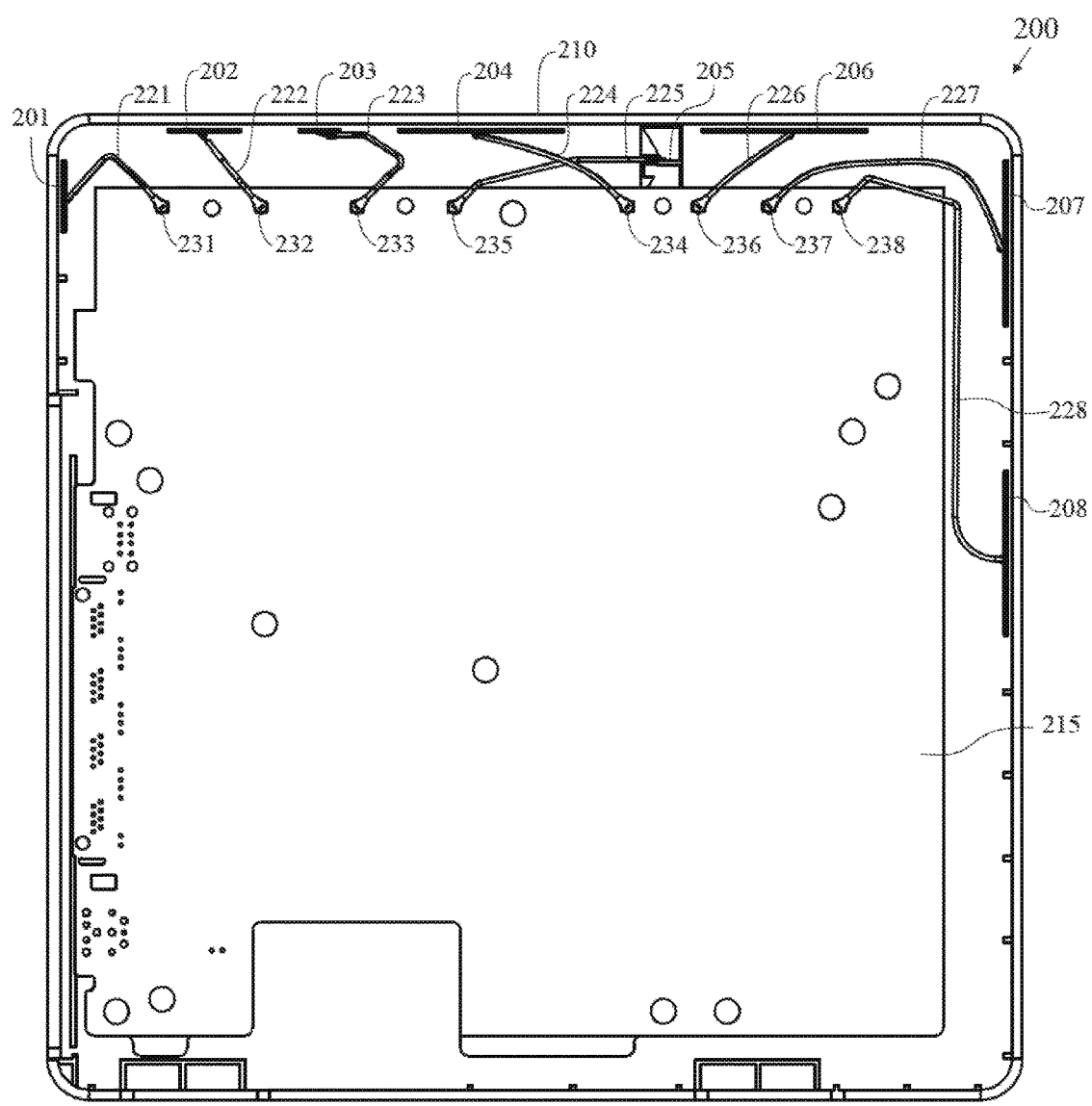
FIG. 7 is a top plan view of an antenna system.
Figure 8:
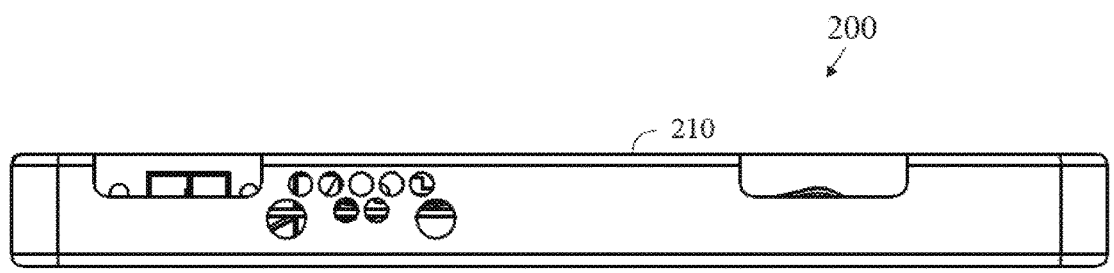
FIG. 8 is a front elevation view of the antenna system of FIG. 7.
Figure 9:
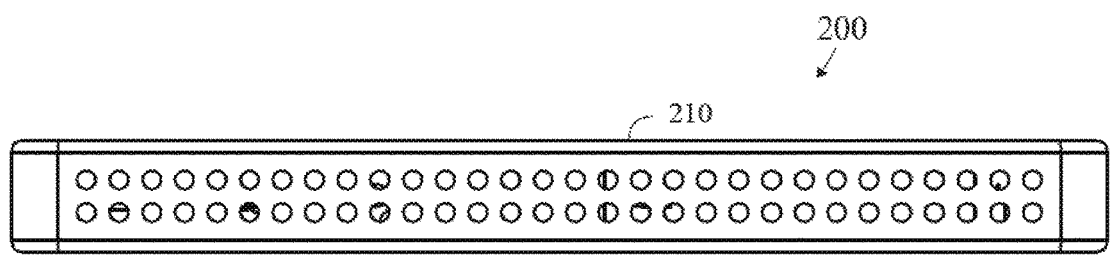
FIG. 9 is a rear elevation view of the antenna system of FIG. 7.
Figure 10:
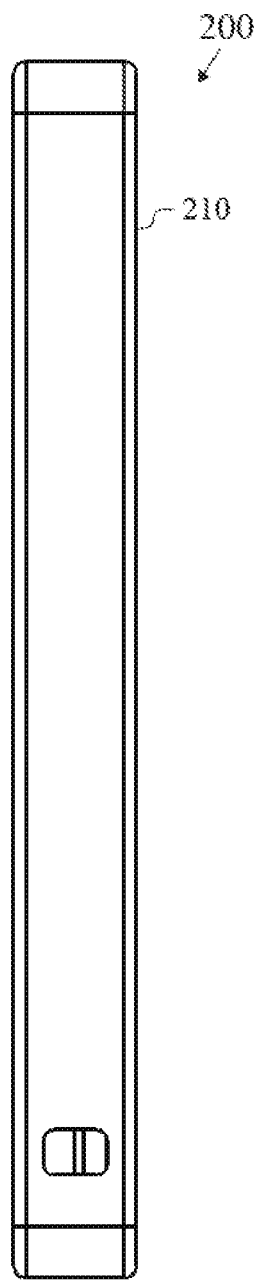
FIG. 10 is side elevation view of the antenna system of FIG. 7.
Figure 11:
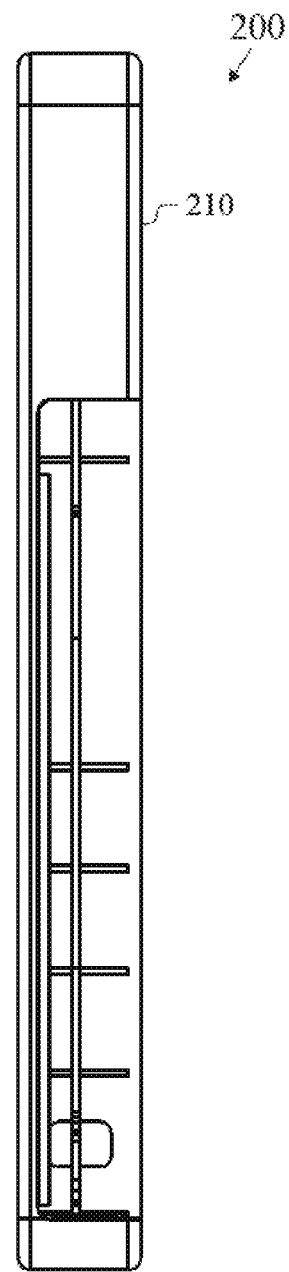
FIG. 11 is a side elevation view of the antenna system of FIG. 7.
Figure 12:
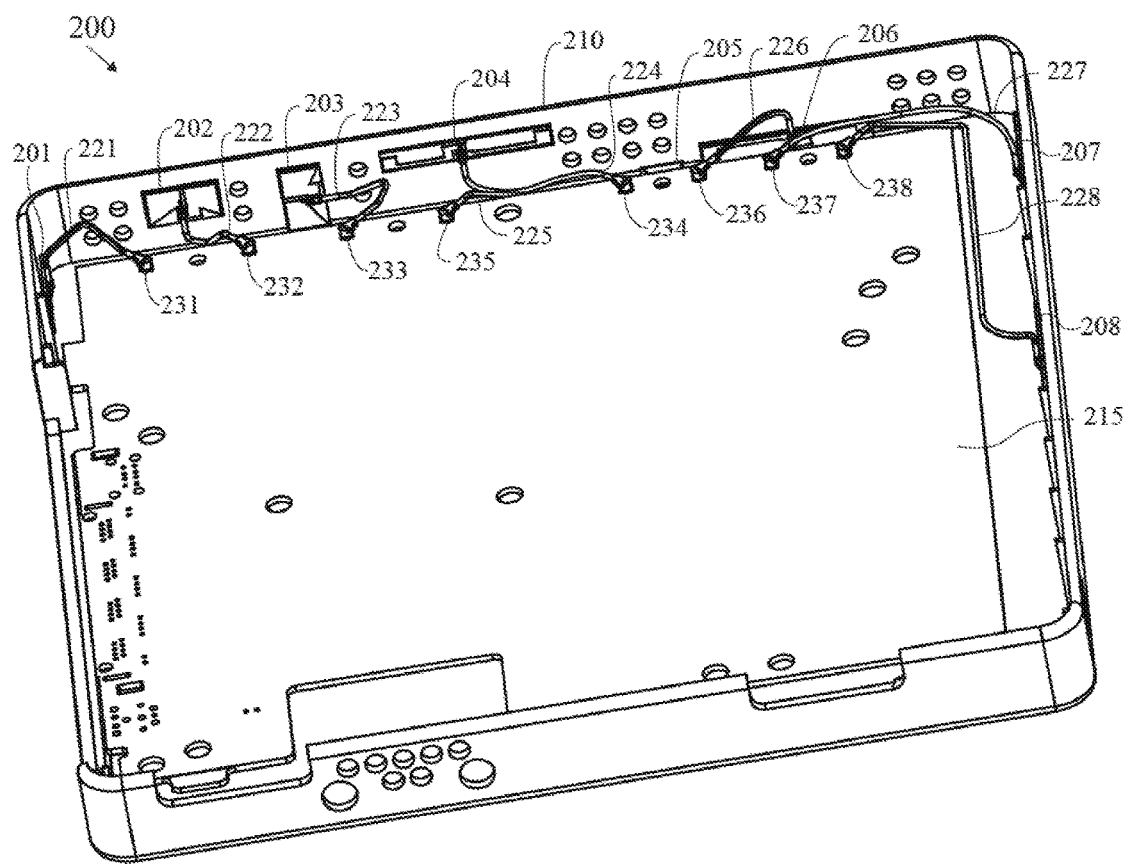
FIG. 12 is a top perspective view of the antenna system of FIG. 7.

In a second embodiment of an antenna placement topology shown in FIGS. 7-12, the antenna system 200 comprises four cable 5G antennas 201, 202, 203 and 205, and four cable 2G antennas 204, 206, 207 and 208. Both of 5G and 2G antennas 201-208 have two vertical and two horizontal polarizations. A PCB 215 is positioned within a housing 210.

A cable 221 links the 5G antenna 201 to connector 231 on the PCB 215. A cable 222 links the 5G antenna 202 to a connector 232 on the PCB 215. A cable 223 links the 5G antenna 203 to a connector 233 on the PCB 215. A cable 224 links the 2G antenna 204 to a connector 234 on the PCB 215. A cable 225 links the 5G antenna 205 to a connector 235 on the PCB 215. A cable 226 links the 2G antenna 206 to a connector 236 on the PCB 215. A cable 227 links the 2G antenna 207 to a connector 237 on the PCB 215. A cable 228 links the 2G antenna 208 to a connector 238 on the PCB 215.

Figure 13:
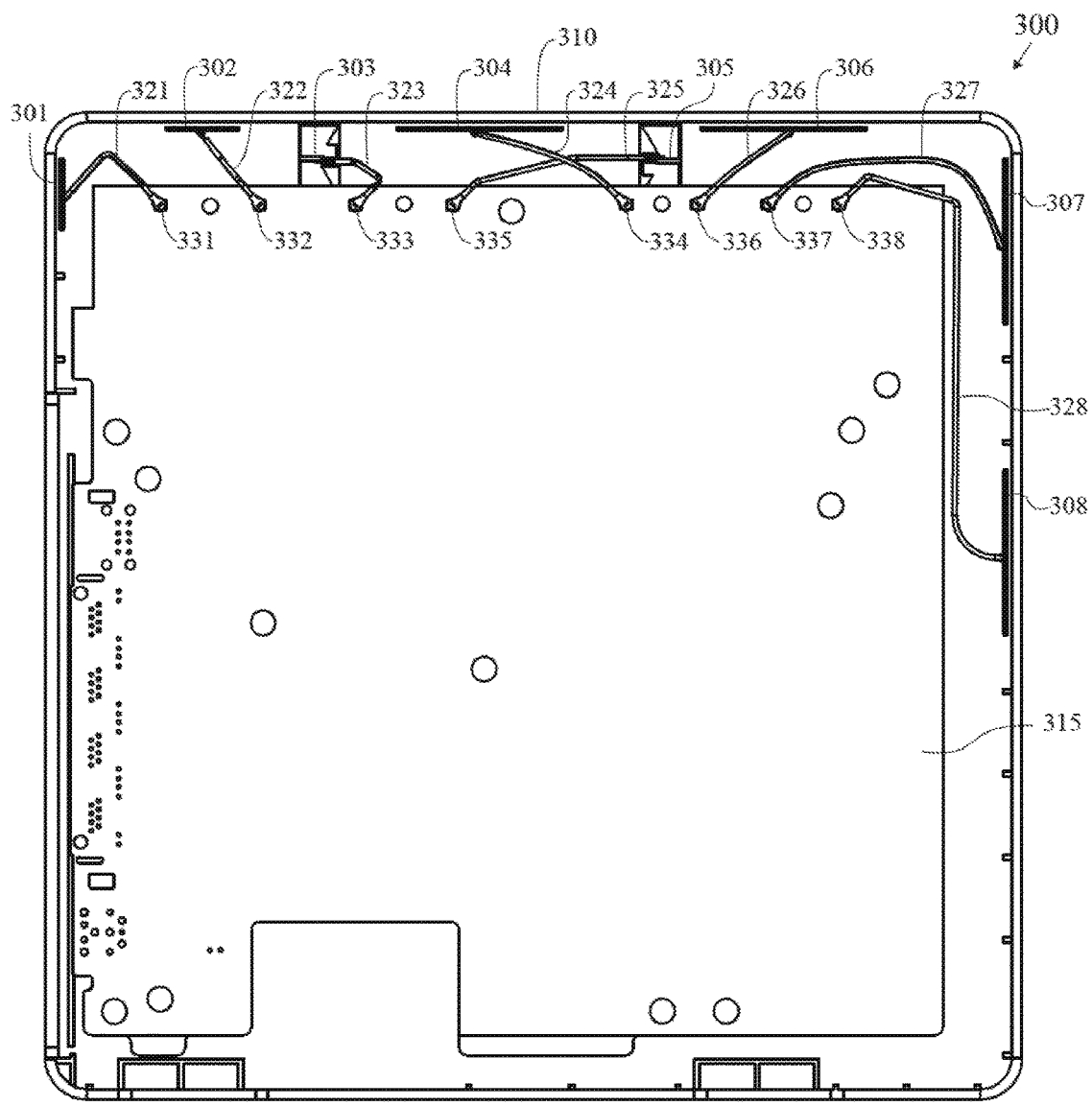
FIG. 13 is a top plan view of an antenna system.
Figure 14:
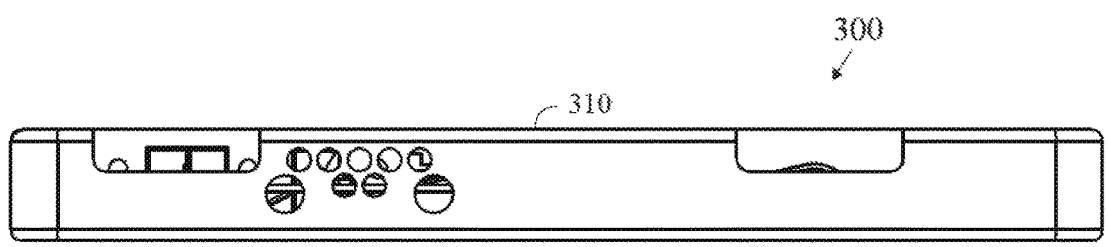
FIG. 14 is a front elevation view of the antenna system of FIG. 13.
Figure 15:
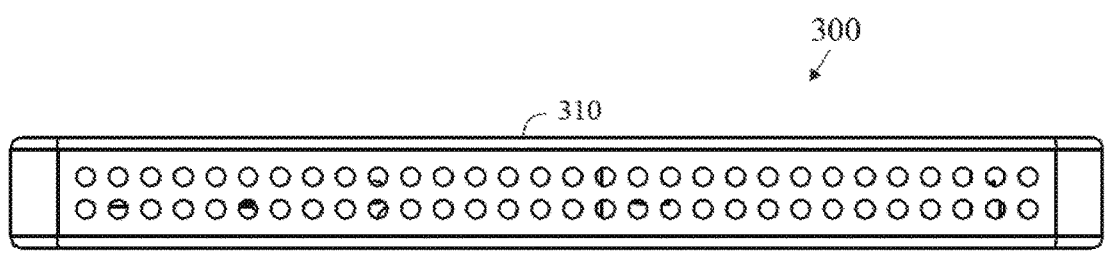
FIG. 15 is a rear elevation view of the antenna system of FIG. 13.
Figure 16:
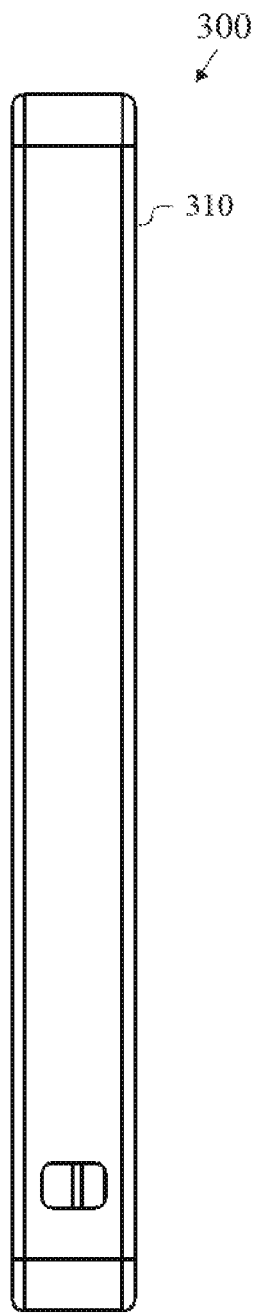
FIG. 16 is side elevation view of the antenna system of FIG. 13.
Figure 17:
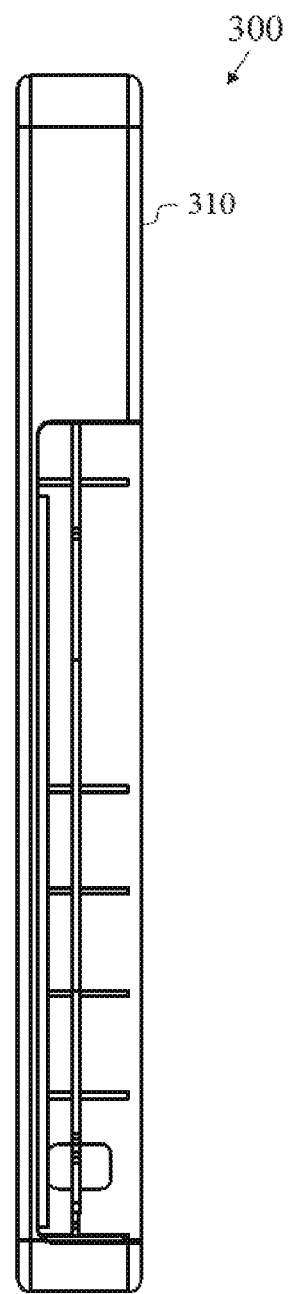
FIG. 17 is a side elevation view of the antenna system of FIG. 13.
Figure 18:
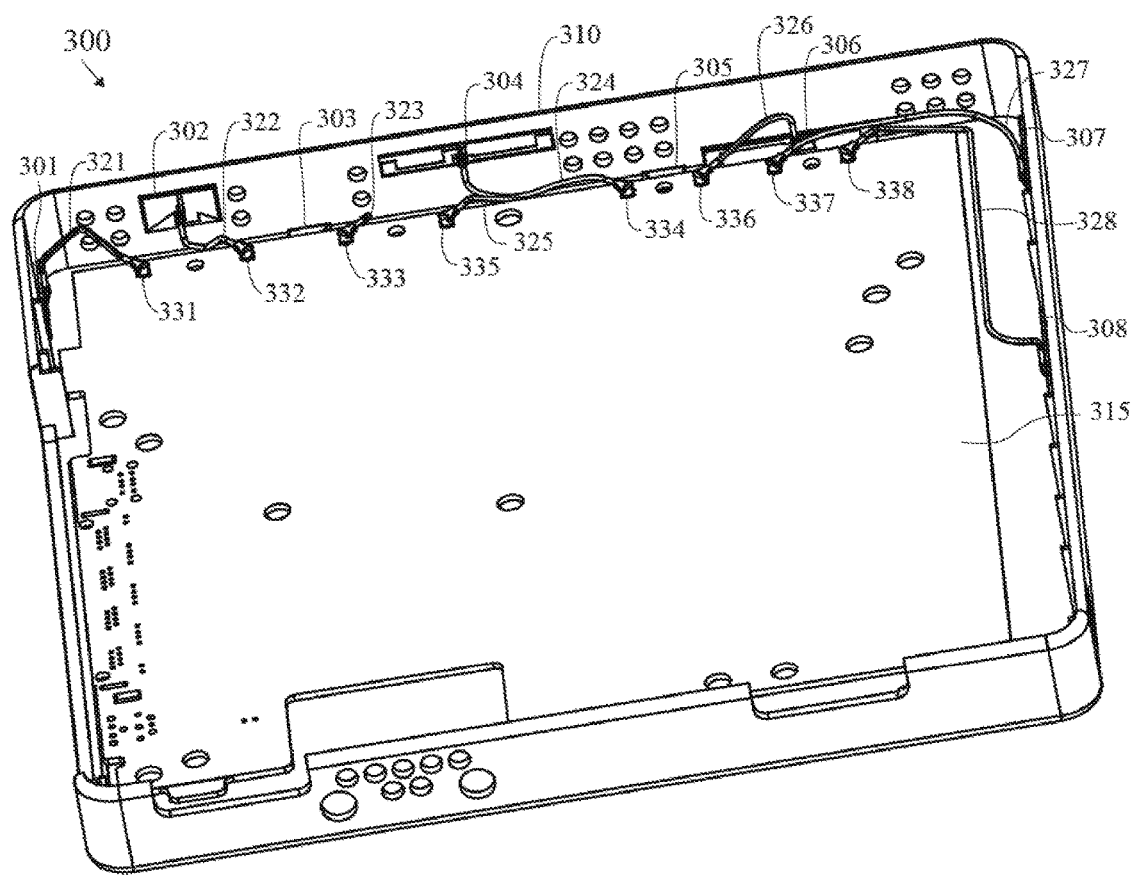
FIG. 18 is a top perspective view of the antenna system of FIG. 13.

In a third embodiment of an antenna placement topology shown in FIGS. 13-18, the antenna system 300 comprises four cable 5G antennas 301, 302, 303 and 305, and four cable 2G antennas 304, 306, 307 and 308. The 5G antennas 301, 302, 303 and 305 have three vertical and one horizontal polarizations, and the 2G antennas 304, 306, 307 and 308 have two vertical and two horizontal polarizations. A PCB 315 is positioned within a housing 310.

A cable 321 links the 5G antenna 301 to a connector 331 on the PCB 315. A cable 322 links the 5G antenna 302 to a connector 332 on the PCB 315. A cable 323 links the 5G antenna 303 to a connector 333 on the PCB 315. A cable 324 links the 2G antenna 304 to a connector 334 on the PCB 315.

A cable 325 links the 5G antenna 305 to a connector 335 on the PCB 315. A cable 326 links the 2G antenna 306 to a connector 336 on the PCB 315. A cable 327 links the 2G antenna 307 to a connector 337 on the PCB 315. A cable 328 links the 2G antenna 308 to connector 338 on the PCB 315.

Figure 19:
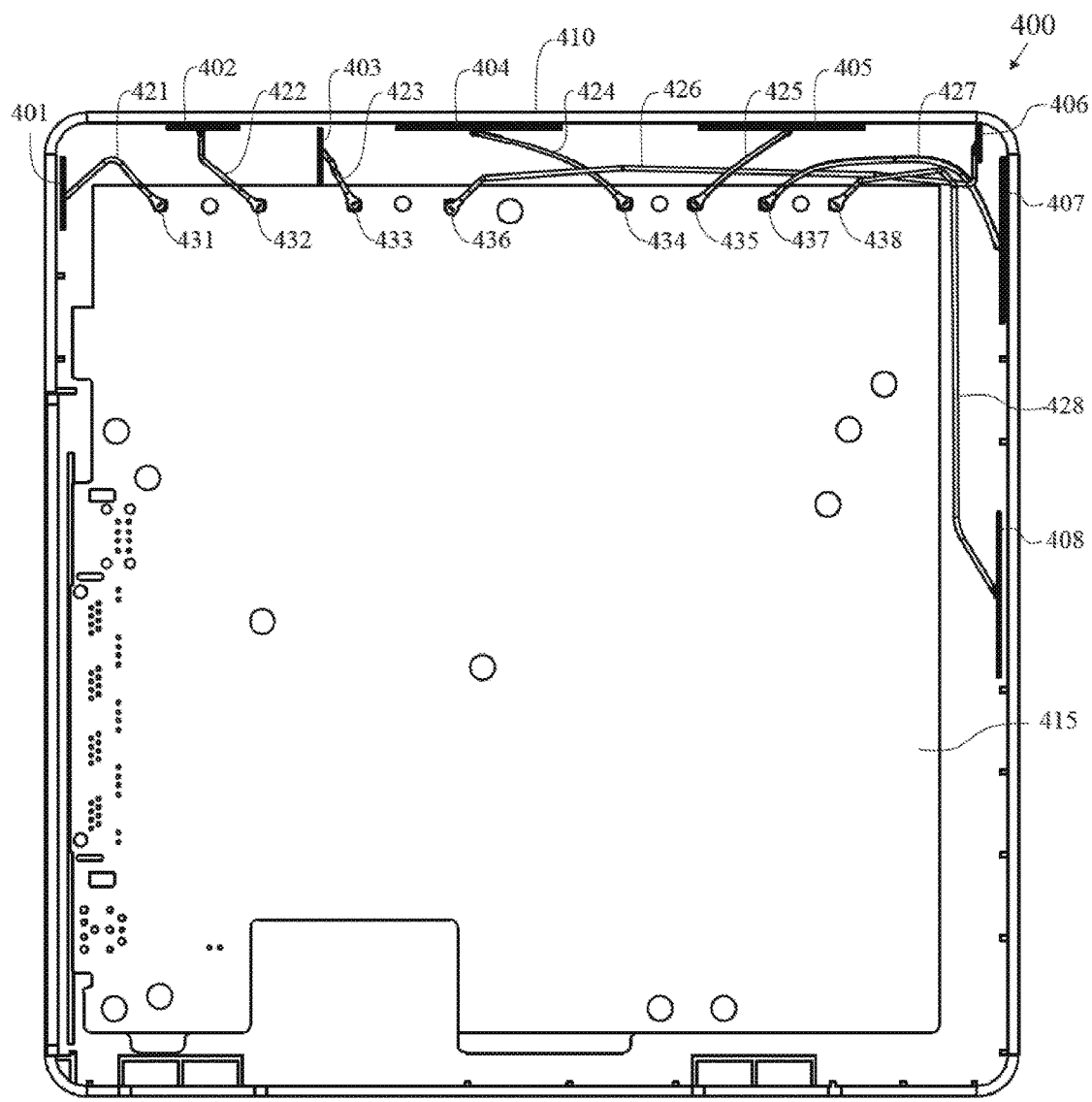
FIG. 19 is a top plan view of an antenna system.
Figure 20:
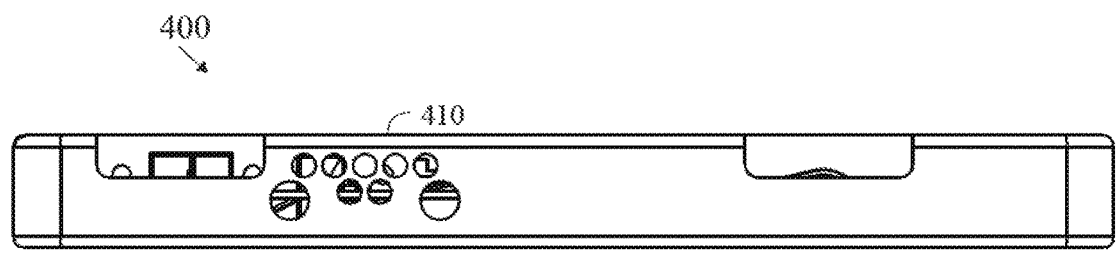
FIG. 20 is a front elevation view of the antenna system of FIG. 19.
Figure 21:
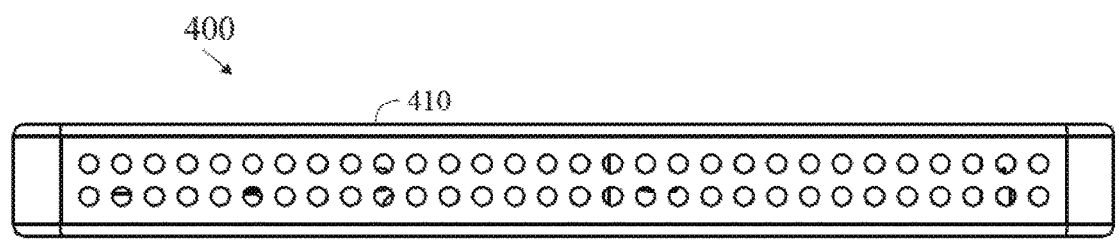
FIG. 21 is a rear elevation view of the antenna system of FIG. 19.
Figure 22:
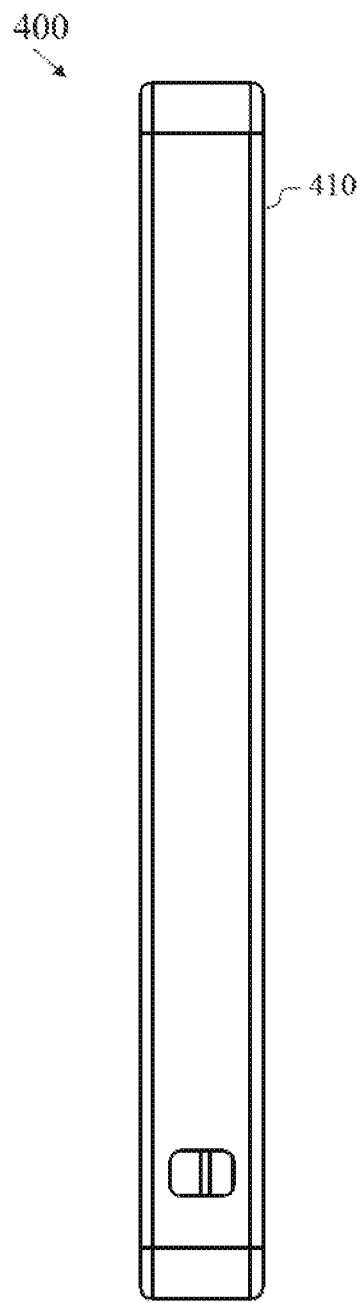
FIG. 22 is side elevation view of the antenna system of FIG. 19.
Figure 23:
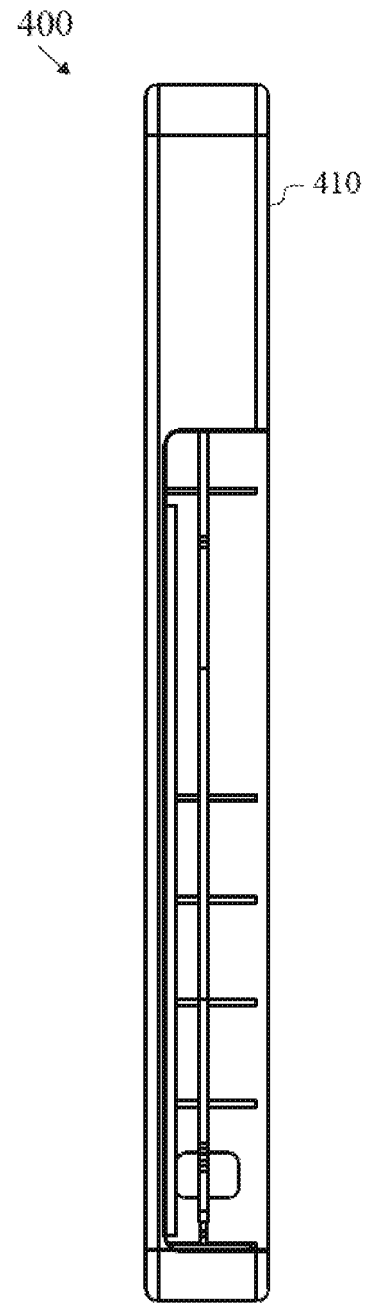
FIG. 23 is a side elevation view of the antenna system of FIG. 19.
Figure 24:
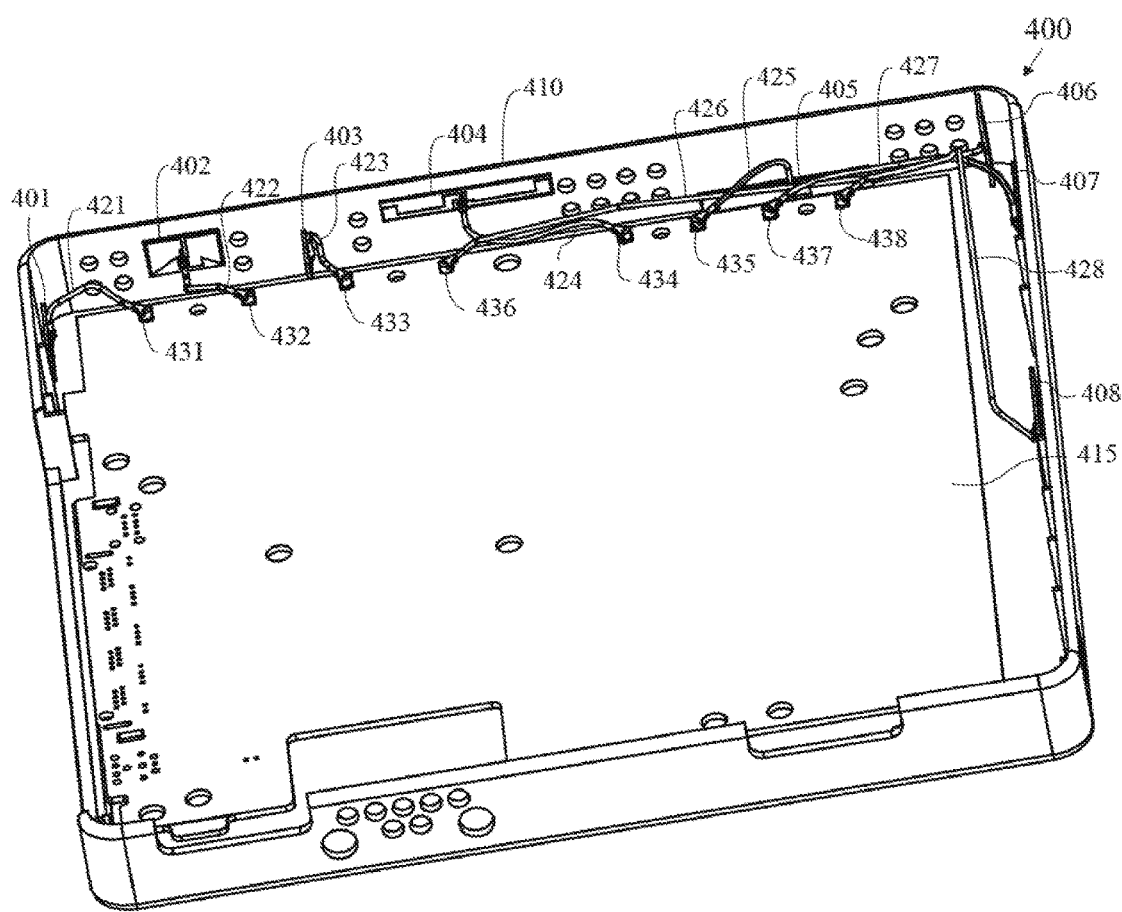
FIG. 24 is a top perspective view of the antenna system of FIG. 19.

In a fourth embodiment of an antenna placement topology shown in FIGS. 19-24, the antenna system 400 comprises four cable 5G antennas 401, 402, 403 and 406, and four cable 2G antennas 404, 405, 407 and 408. The 5G antennas having two vertical and two horizontal polarizations, and one placed at far right top location; and the 2G antennas having two vertical and two horizontal polarizations. A PCB 415 is positioned within a housing 410.

A cable 421 links the 5G antenna 401 to a connector 431 on the PCB 415. A cable 422 links the 5G antenna 402 to a connector 432 on the PCB 415. A cable 423 links the 5G antenna 403 to a connector 433 on the PCB 415. A cable 424 links the 2G antenna 404 to a connector 434 on the PCB 415. A cable 425 links the 2G antenna 405 to a connector 435 on the PCB 415. A cable 426 links the 5G antenna 406 to a connector 436 on the PCB 415. A cable 427 links the 2G antenna 407 to a connector 437 on the PCB 415. A cable 428 links the 2G antenna 408 to a connector 438 on the PCB 415.

Figure 25:
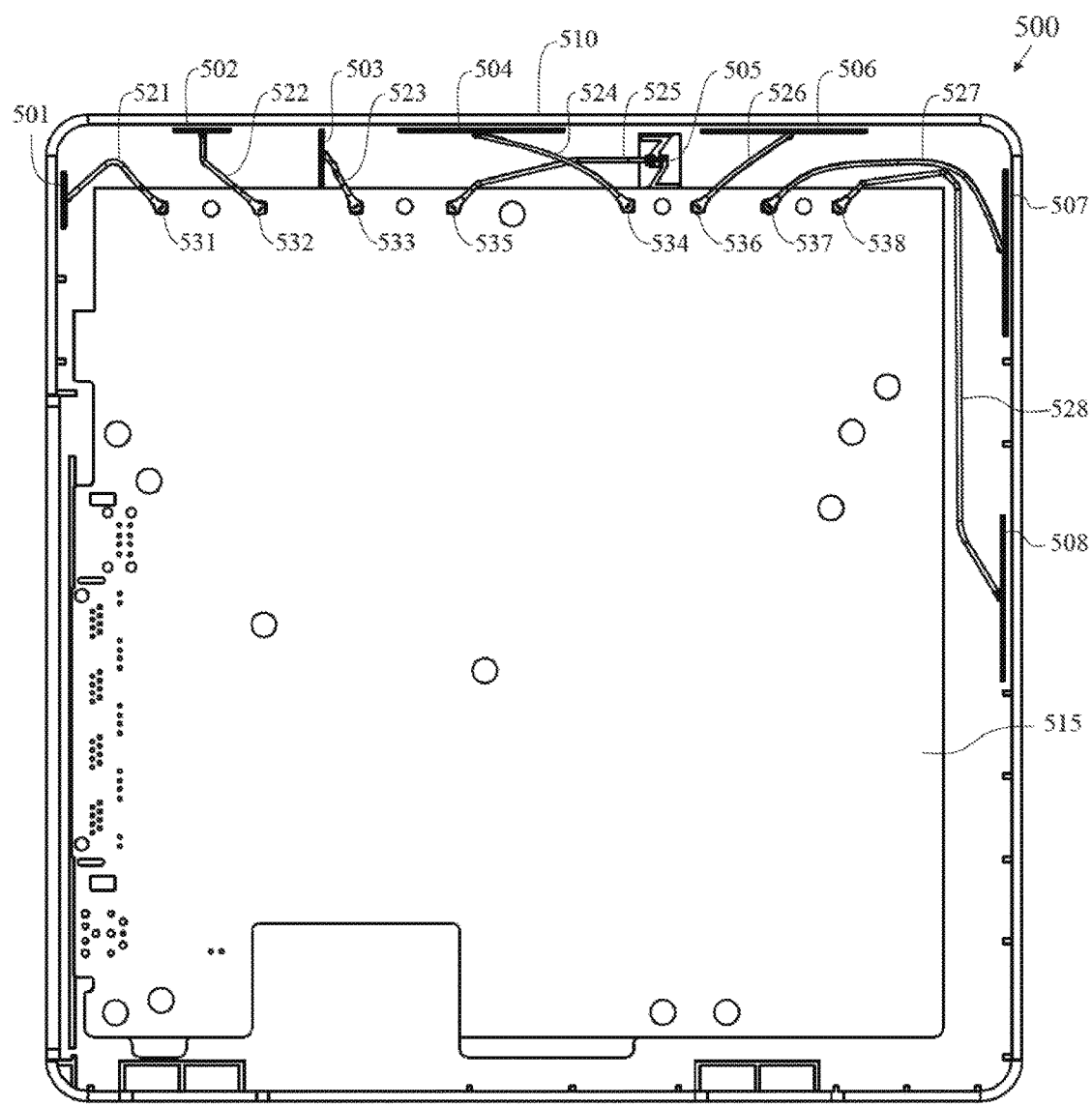
FIG. 25 is a top plan view of an antenna system.
Figure 26:
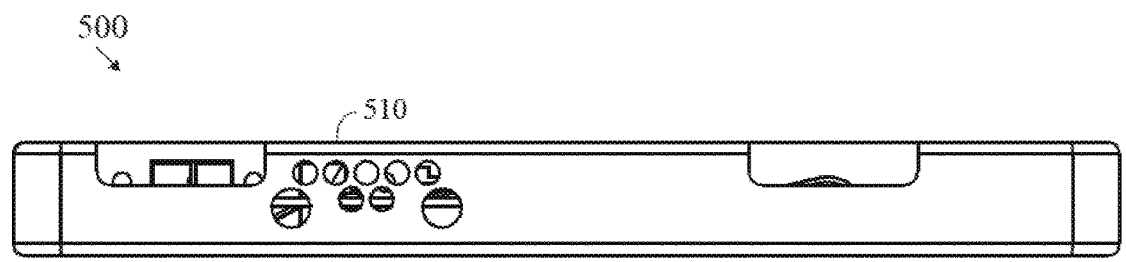
FIG. 26 is a front elevation view of the antenna system of FIG. 25.
Figure 27:
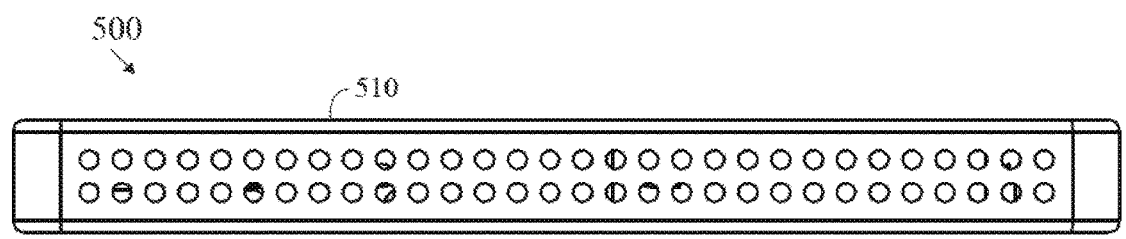
FIG. 27 is a rear elevation view of the antenna system of FIG. 25.
Figure 28:
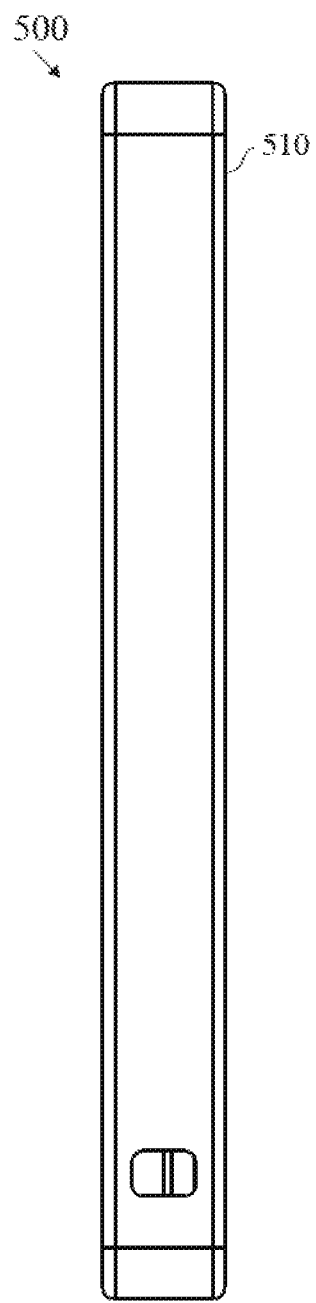
FIG. 28 is side elevation view of the antenna system of FIG. 25.
Figure 29:
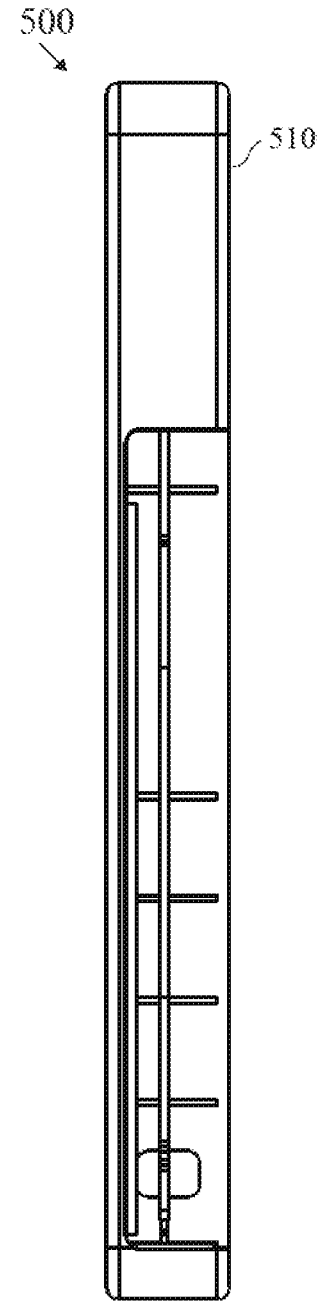
FIG. 29 is a side elevation view of the antenna system of FIG. 25.
Figure 30:
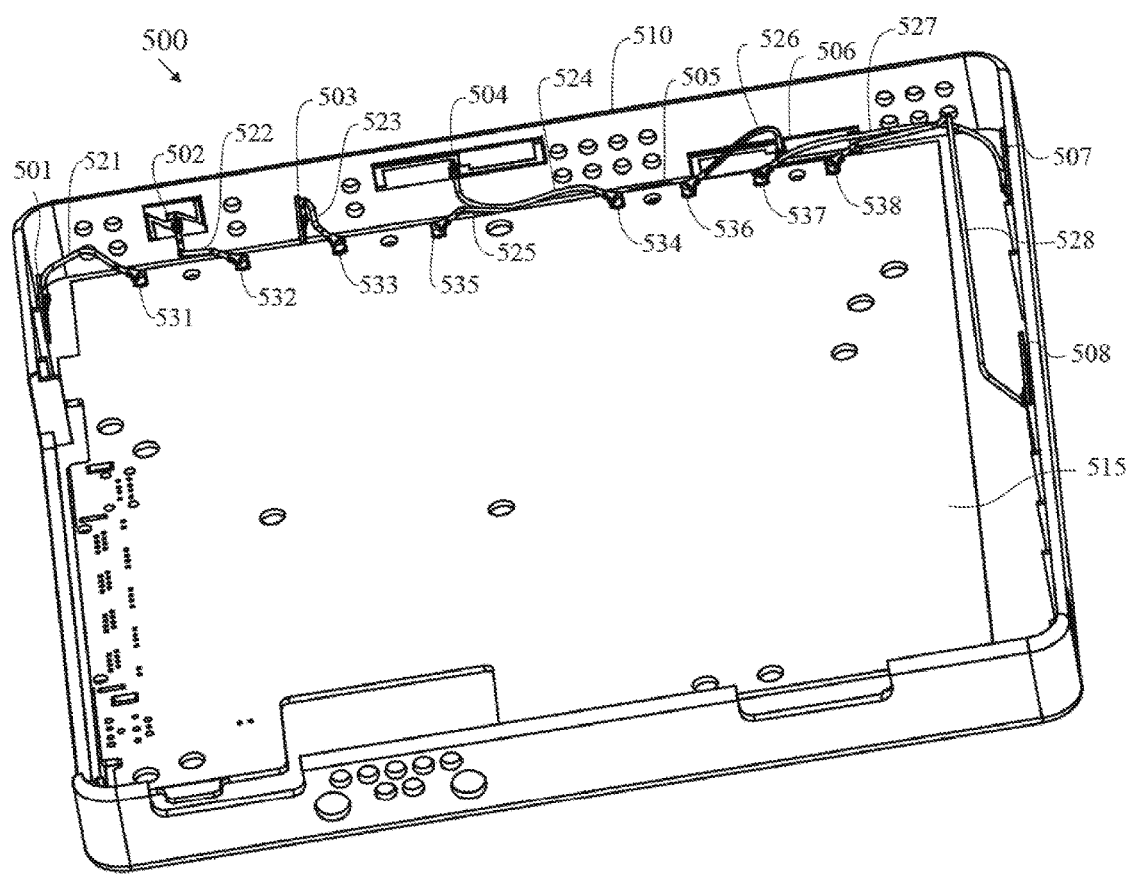
FIG. 30 is a top perspective view of the antenna system of FIG. 25.

In a fifth embodiment of an antenna placement topology shown in FIGS. 25-30, the antenna system 500 comprises four cable 5G antennas 501, 502, 503 and 505, and four cable 2G antennas 504, 506, 507 and 508. The 5G antennas 501, 502, 503 and 505 include three vertical and one horizontal polarizations; and the 2G antennas 504, 506, 507 and 508 include two vertical and two horizontal polarizations. A PCB 515 is positioned within a housing 510.

A cable 521 links the 5G antenna 501 to a connector 531 on the PCB 515. A cable 522 links the 5G antenna 502 to a connector 532 on the PCB 515. A cable 523 links the 5G antenna 503 to a connector 533 on the PCB 515. A cable 524 links the 2G antenna 504 to a connector 534 on the PCB 515. A cable 525 links the 5G antenna 505 to a connector 535 on the PCB 515. A cable 526 links the 2G antenna 506 to a connector 536 on the PCB 515. A cable 527 links the 2G antenna 507 to a connector 537 on the PCB 515. A cable 528 links the 2G antenna 508 to a connector 538 on the PCB 515.

Figure 31:
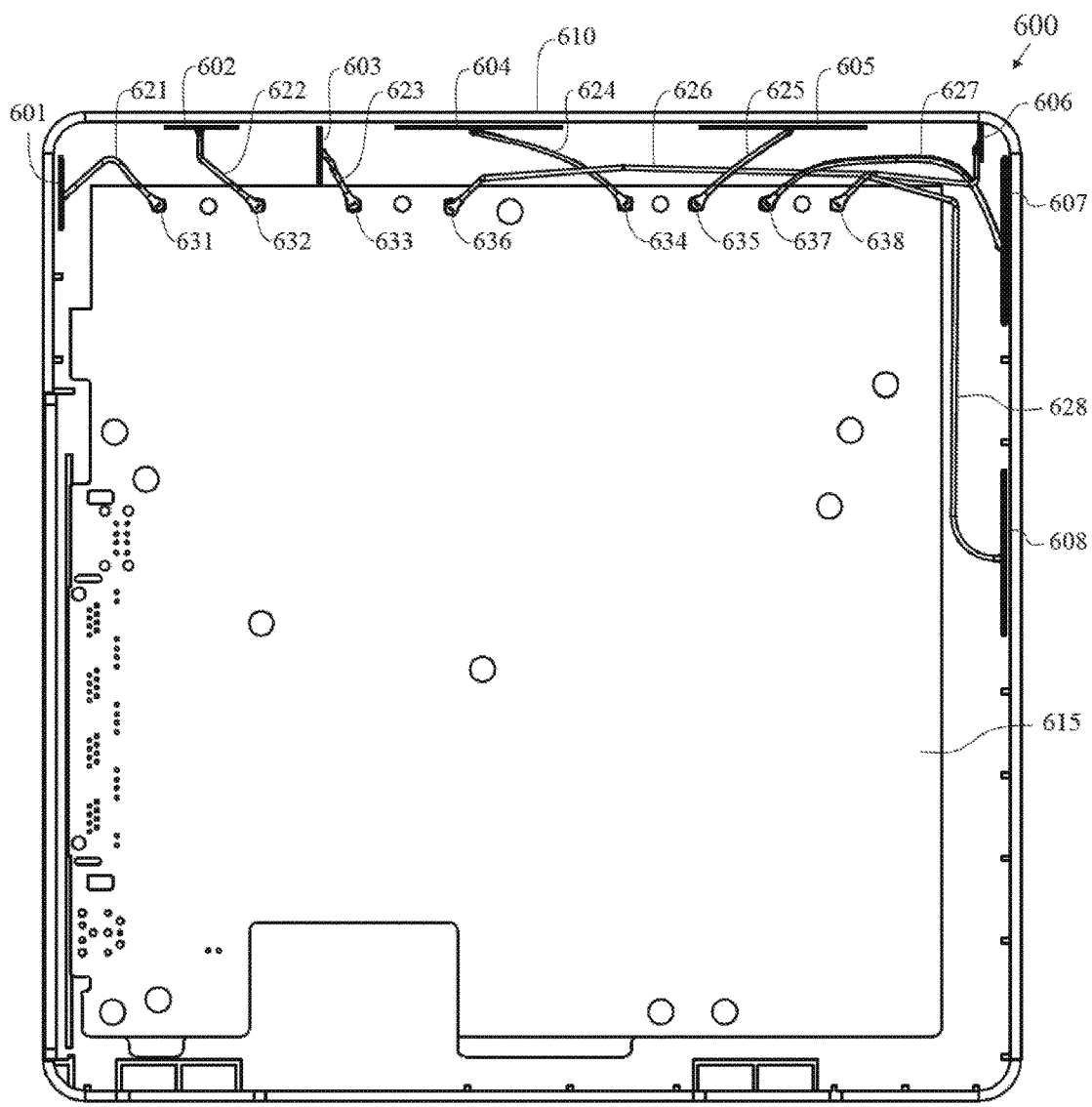
FIG. 31 is a top plan view of an antenna system.
Figure 32:
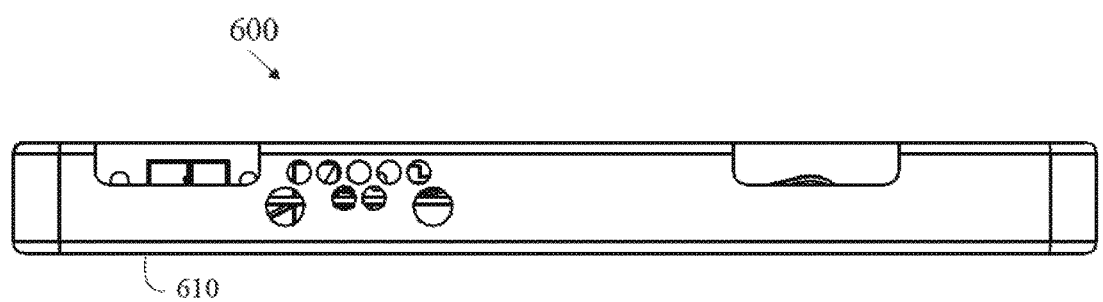
FIG. 32 is a front elevation view of the antenna system of FIG. 31.
Figure 33:
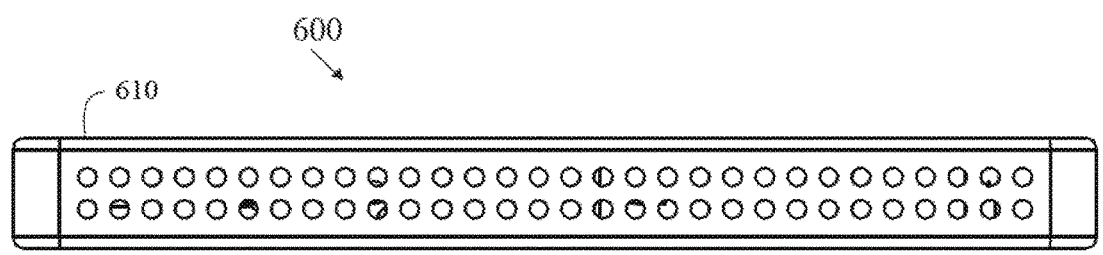
FIG. 33 is a rear elevation view of the antenna system of FIG. 31.
Figure 36:
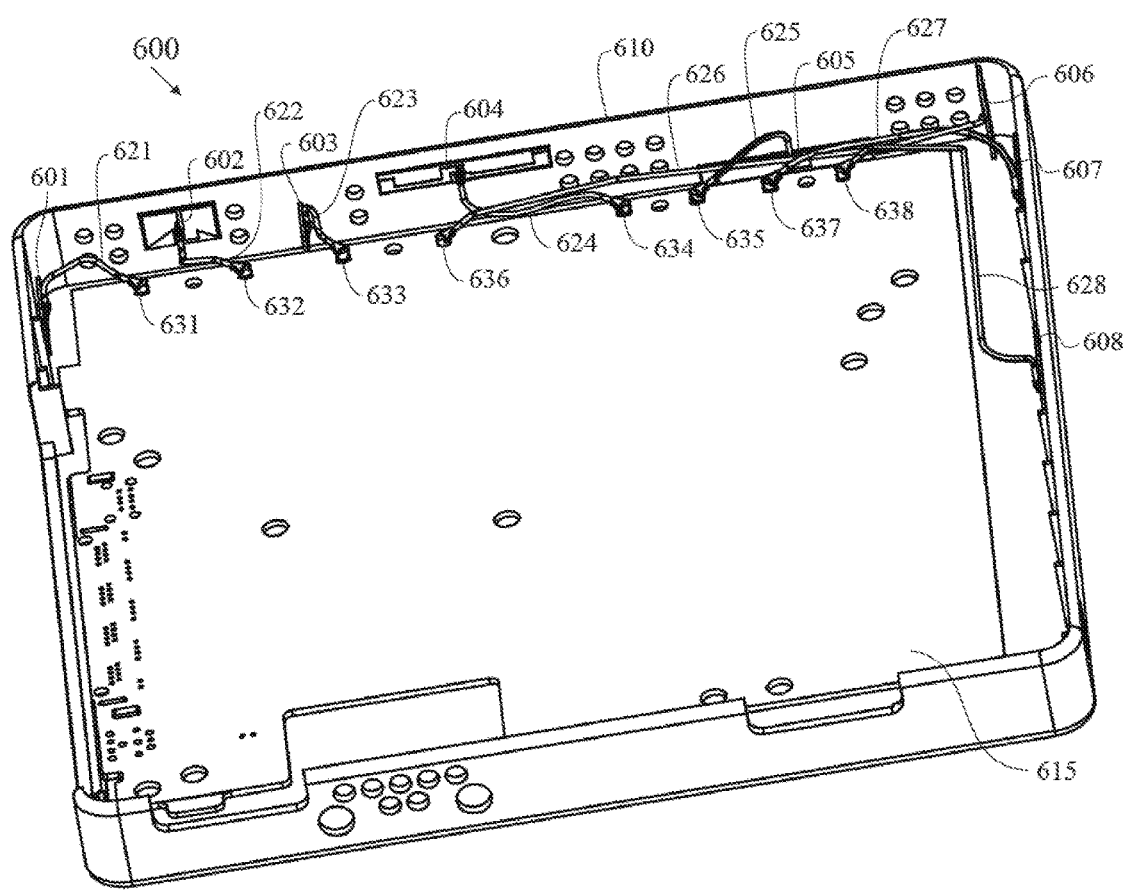

In a sixth embodiment of an antenna placement topology in FIGS. 31-36, the antenna system 600 comprises four cable 5G antennas 601, 602, 603 and 606, and four cable 2G antennas 604, 605, 607 and 608. The 5G antennas 601, 602, 603 and 606 include two vertical and two horizontal polarizations and different antenna types from the fourth embodiment; and the 2G antennas 604, 605, 607 and 608 include two vertical and two horizontal polarizations. A PCB 615 is positioned within a housing 610.

A cable 621 links the 5G antenna 601 to a connector 631 on the PCB 615. A cable 622 links the 5G antenna 602 to a connector 632 on the PCB 615. A cable 623 links the 5G antenna 603 to a connector 633 on the PCB 615. A cable 624 links the 2G antenna 604 to a connector 634 on the PCB 615. A cable 625 links the 2G antenna 605 to a connector 635 on the PCB 615. A cable 626 links the 5G antenna 606 to a connector 636 on the PCB 615. A cable 627 links the 2G antenna 607 to a connector 637 on the PCB 615. A cable 628 links the 2G antenna 608 to a connector 638 on the PCB 615.

He, U.S. Pat. No. 9,362,621 for a Multi-Band LTE Antenna is hereby incorporated by reference in its entirety.

Abramov et al., U.S. Pat. No. 7,215,296 for a Switch Multi-Beam Antenna Serial is hereby incorporated by reference in its entirety.

Salo et al., U.S. Pat. No. 7,907,971 for an Optimized Directional Antenna System is hereby incorporated by reference in its entirety.

Abramov et al., U.S. Pat. No. 7,570,215 for an Antenna device with a controlled directional pattern and a planar directional antenna is hereby incorporated by reference in its entirety.

Abramov et al., U.S. Pat. No. 7,570,215 for an Antenna device with a controlled directional pattern and a planar directional antenna is hereby incorporated by reference in its entirety.

Abramov et al., U.S. Pat. No. 8,423,084 for a Method for radio communication in a wireless local area network and transceiving device is hereby incorporated by reference in its entirety.

Khitrik et al., U.S. Pat. No. 7,336,959 for an Information transmission method for a wireless local network is hereby incorporated by reference in its entirety.

Khitrik et al., U.S. Pat. No. 7,043,252 for an Information transmission method for a wireless local network is hereby incorporated by reference in its entirety.

Abramov et al., U.S. Pat. No. 8,184,601 for a METHOD FOR RADIO COMMUNICATION IN A WIRELESS LOCAL AREA NETWORK WIRELESS LOCAL AREA NETWORK AND TRANSCEIVING DEVICE is hereby incorporated by reference in its entirety.

Abramov et al., U.S. Pat. No. 7,627,300 for a Dynamically optimized smart antenna system is hereby incorporated by reference in its entirety.

Abramov et al., U.S. Pat. No. 6,486,832 for a Direction-agile antenna system for wireless communications is hereby incorporated by reference in its entirety.

Yang, U.S. Pat. No. 8,081,123 for a COMPACT MULTI-LEVEL ANTENNA WITH PHASE SHIFT is hereby incorporated by reference in its entirety.

Nagaev et al., U.S. Pat. No. 7,292,201 for a Directional antenna system with multi-use elements is hereby incorporated by reference in its entirety.

Abramov et al., U.S. Pat. No. 7,696,948 for a Configurable directional antenna is hereby incorporated by reference in its entirety.

Abramov et al., U.S. Pat. No. 7,965,242 for a Dual-band antenna is hereby incorporated by reference in its entirety.

Abramov et al., U.S. Pat. No. 7,729,662 for a Radio communication method in a wireless local network is hereby incorporated by reference in its entirety.

Abramov et al., U.S. Pat. No. 8,248,970 for an OPTIMIZED DIRECTIONAL MIMO ANTENNA SYSTEM is hereby incorporated by reference in its entirety.

Visuri et al., U.S. Pat. No. 8,175,036 for a MULTIMEDIA WIRELESS DISTRIBUTION SYSTEMS AND METHODS is hereby incorporated by reference in its entirety.

Yang, U.S. Patent Publication Number 20110235755 for an MIMO Radio System With Antenna Signal Combiner is hereby incorporated by reference in its entirety.

Yang et al., U.S. Pat. No. 9,013,355 for an L SHAPED FEED AS PART OF A MATCHING NETWORK FOR A MICROSTRIP ANTENNA is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this

We claim as our invention:

1. An antenna system comprising:
   a housing;
   a printed circuit board ("PCB") positioned within the housing;
   three cable 5G antennas position on walls of the housing;
   one on-board 5G antenna attached to the PCB;
   three cable 2G antennas positioned on walls of the housing;
   one on-board 2G antenna attached to the PCB;
   wherein the three cable 5G antennas have one vertical and two horizontal polarizations;
   wherein the on-board antennas have mixed polarization.

2. The antenna system according to claim 1 wherein a first cable 5G antenna is on a first wall of the housing, a second cable 5G antenna is on a second wall of the housing, a third cable 5G antenna is adjacent the second cable 5G antenna on the second wall of the housing, a first cable 2G antenna is on the second wall of the housing adjacent the third cable 5G antenna, a second cable 2G antenna is adjacent the first cable 2G antenna on the second wall of the housing, a third cable 2G antenna is on a third wall of the housing, wherein the first wall is perpendicular to the second wall, and the second wall is perpendicular to the third wall.

3. An antenna system comprising:
   a housing;
   a printed circuit board ("PCB") positioned within the housing;
   four cable 5G; and
   four cable 2G antennas;
   wherein the four cable 5G antennas have three vertical and one horizontal polarizations, and wherein the four cable 2G antennas have two vertical and two horizontal polarizations.

4. An antenna system comprising:
   a housing;
   a printed circuit board ("PCB") positioned within the housing;
   four cable 5G; and
   four cable 2G antennas;
   wherein the four cable 5G antennas and the four cable 2G antennas each have two vertical and two horizontal polarizations.

5. An antenna system comprising:
   a housing;
   a printed circuit board ("PCB") positioned within the housing;
   four cable 5G; and
   four cable 2G antennas;
   wherein the four cable 5G antennas have two vertical and two horizontal polarizations, and wherein one cable 5G antenna is placed at far right top location; and
   wherein the four cable 2G antennas having two vertical and two horizontal polarizations.

6. An antenna system comprising:
   a housing;
   a printed circuit board ("PCB") positioned within the housing;
   four cable 5G; and
   four cable 2G antennas;
   wherein a first cable 5G antenna is on a first wall of the housing, a second cable 5G antenna is on a second wall of the housing, a third cable 5G antenna is adjacent the second cable 5G antenna on the second wall of the housing, a first cable 2G antenna is on the second wall of the housing adjacent the third cable 5G antenna, a fourth cable 5G antenna is adjacent the first cable 2G antenna on the second wall of the housing, a second cable 2G antenna is adjacent the fourth cable 5G antenna on the second wall of the housing, a third cable 2G antenna is on a third wall of the housing, and a fourth cable 2G antenna is adjacent the third cable 2G antenna on the third wall of the housing, wherein the first wall is perpendicular to the second wall, and the second wall is perpendicular to the third wall.

* * * * *